(12) United States Patent
Nakamichi et al.

(10) Patent No.: US 7,680,046 B2
(45) Date of Patent: Mar. 16, 2010

(54) WIDE AREA LOAD SHARING CONTROL SYSTEM

(75) Inventors: Koji Nakamichi, Kawasaki (JP); Hitoshi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1868 days.

(21) Appl. No.: 10/618,365

(22) Filed: Jul. 10, 2003

(65) Prior Publication Data
US 2004/0008707 A1 Jan. 15, 2004

(30) Foreign Application Priority Data
Jul. 11, 2002 (JP) ............................. 2002-202351

(51) Int. Cl.
*H04L 12/26* (2006.01)
(52) U.S. Cl. ..................... 370/235; 370/360
(58) Field of Classification Search ............... 370/392, 370/389, 351, 359, 237, 230, 235, 232, 252, 370/401, 402, 396, 398, 217, 219, 220, 360, 370/399, 229, 231, 238, 248, 253; 710/316, 710/317
See application file for complete search history.

(56) References Cited

U.S. PATENT DOCUMENTS

| | | | | |
|---|---|---|---|---|
| 6,665,495 | B1 * | 12/2003 | Miles et al. | 398/54 |
| 6,876,629 | B2 * | 4/2005 | Beshai et al. | 370/232 |
| 6,882,799 | B1 * | 4/2005 | Beshai et al. | 398/45 |
| 6,904,017 | B1 * | 6/2005 | Meempat et al. | 370/238 |
| 7,206,861 | B1 * | 4/2007 | Callon | 709/242 |
| 2001/0019554 | A1 | 9/2001 | Nomura et al. | |
| 2002/0141343 | A1 * | 10/2002 | Bays | 370/235 |
| 2003/0074388 | A1 * | 4/2003 | Pham et al. | 709/106 |
| 2003/0196078 | A1 * | 10/2003 | Wise et al. | 712/300 |
| 2004/0025000 | A1 * | 2/2004 | Wise et al. | 712/300 |

FOREIGN PATENT DOCUMENTS

| | | |
|---|---|---|
| EP | 1 130 849 | 9/2001 |
| JP | 2001-251343 | 9/2001 |
| JP | 2001-320420 | 11/2001 |

OTHER PUBLICATIONS

Notice of Reason for Rejection dated May 31, 2005.

\* cited by examiner

*Primary Examiner*—Brenda Pham
(74) *Attorney, Agent, or Firm*—Katten Muchin Rosenman LLP

(57) ABSTRACT

A wide area load sharing control system includes a statistic information gathering module obtaining from respective nodes, as statistic information, a traffic state of links connected to the respective nodes in a network, a route determining module determining, based on the obtained statistic information, at least one route for extending a plurality of paths between ingress edge nodes and egress edge nodes that correspond to within a traffic engineering section in the network, and a load sharing determining module determining, based on the obtained statistic information, a ratio at which a traffic should be distributed to respective paths on the determined route. Active modules among the statistic information gathering module, the route determining module and the load sharing determining module are switched over to between the ingress edge nodes and the network control device concentratedly controlling the respective nodes, mutually.

15 Claims, 6 Drawing Sheets

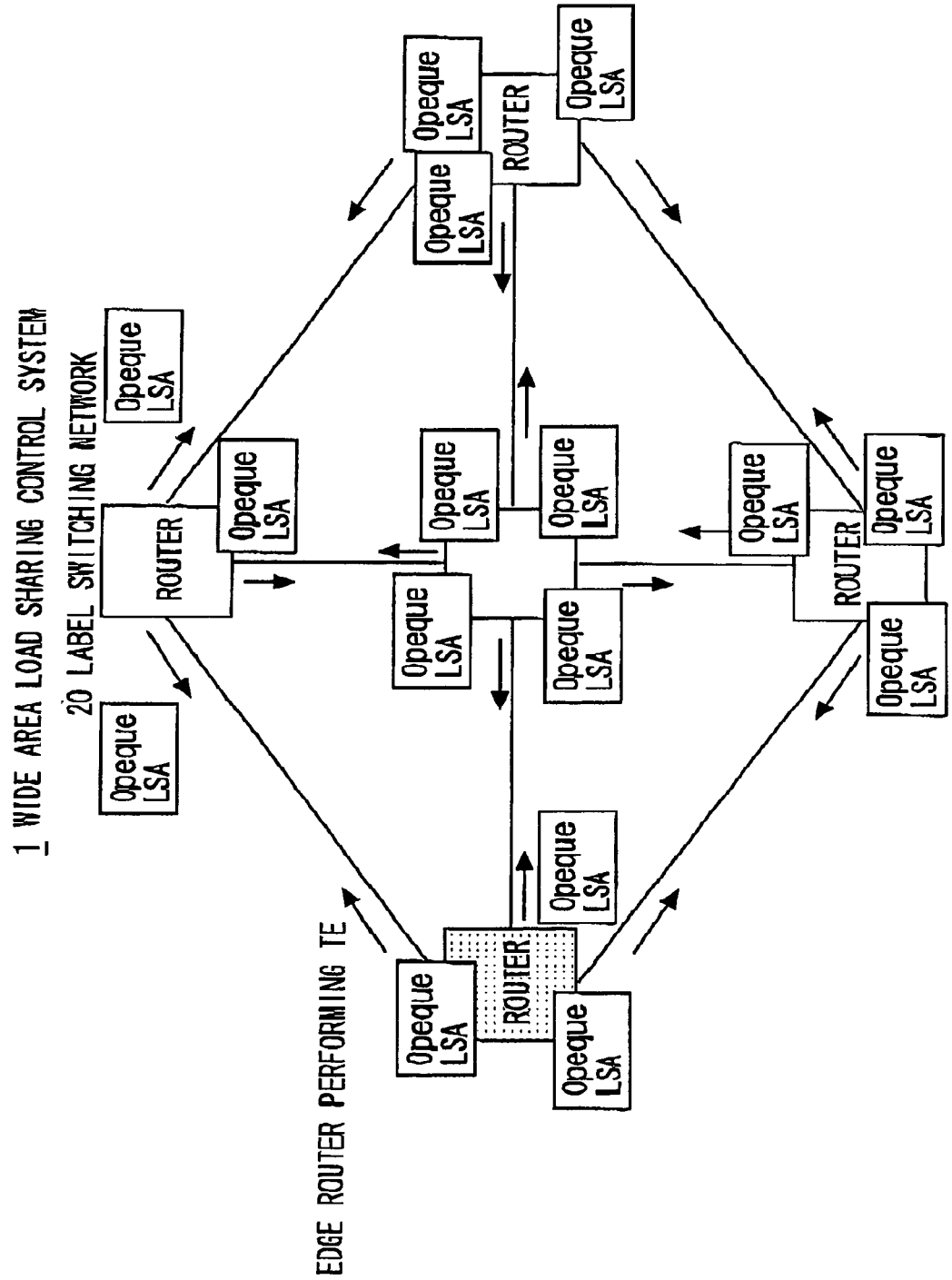

ured in the edge nodes and to effi-
WIDE AREA LOAD SHARING CONTROL SYSTEM

BACKGROUND OF THE INVENTION

The present invention relates generally to a load sharing control system that enables load sharing in the case of forwarding packets in an IP (Internet Protocol) network, and more particularly to a wide area load sharing control system that enables packets to be forwarded with a high quality in a large-scale label switching network.

Traffic engineering (which will hereinafter abbreviated to TE in some cases) is a technique for performing wide area load sharing in the IP network. This traffic engineering is a technical concept aiming at avoiding congestion in the network or efficiently utilizing network resources by forwarding the packets via a plurality of routes in a way that does not stick to the route determined by an existing routing protocol (routing algorithm). MPLS (Multiprotocol Label Switching) is a protocol used for build a network architecture in which the TE is concretely conducted.

MPLS enables a packet attached with a fixed-length label to be forwarded across a preset-up connection known as LSP (Label Switched Path). According to MPLS, the traffic control using paths on the IP network can be attained by extending (setting up or establishing) the LSPs along on a route obtained by an IP-based routing protocol.

Further, MPLS enables the set-up of the paths independent of the existing IP routing, and therefore the traffic engineering (TE) can be performed by utilizing these paths. One example thereof is wide area load sharing control involving the use of a plurality of LSPs.

The load sharing control is defined as a technique for distributing an input traffic to ingress edge routers to a plurality of paths by setting up these paths in an intra-network traffic engineering section, i.e., between the ingress edge routers (nodes) that execute the TE and egress edge routers. It is possible to avoid the load from concentrating on a single route, improve a resource usage efficiency in the whole network and avoid a long-term congestion by adopting this load sharing control technique.

Another load sharing control technique involve adopting such a control method that a scheme is not that the plurality of paths are set up from the beginning but that a load state of the traffic in the network is monitored at all times and, when a load on a certain route increases, a new path is established by searching for a different route directed to the same destination.

What has generally been proposed so far in order to execute the TE-based wide area load sharing is to install (a) a statistic information gathering function, (b) a route calculating (route searching) function and (c) a load sharing calculating function (algorithm) into the respective edge routers in the MPLS-based label switching network. Namely, each of the edge routers operates autonomously distributively the functions necessary for the TE.

This autonomous distribution type traffic engineering has requires, in (a) the statistic information gathering function, a creation of a special message by which all the routers (edge routers and core routers) notify each edge router of the self-router statistic information (traffic information). This message format is not yet standardized. Hence, there is a case where the routers in the network can not send and receive the message, and there arises a problem in which a flexibility of building the network might be lost.

Further, according to the autonomous distribution type TE, if all the functions (a) through (c) are executed in the edge routers, it can be considered that a processing performance declines due to a rise in a CPU load of the router concerned. In particular, the router generally uses a large quantity of CPU resources for a packet forwarding process, a routing protocol process and so on, and hence it is inevitable that a performance of the essential function of the router declines because of executing the traffic engineering (TE) process.

Moreover, the functions (a) through (c) and the routing protocol process come to have a higher processing load with a larger number of routers in the network. Accordingly, in the autonomous distribution type TE by the edge routers, a scale-up of the network is difficult to attain.

SUMMARY OF THE INVENTION

It is a first object of the present invention to relieve a processing load of functions needed for traffic engineering that has hitherto been conducted in edge nodes and to efficiently perform wide area load sharing at a large scale.

It is a second object of the present invention to enable the wide area load sharing to be executed without adding a special message processing function to the conventional edge routers and core routers by avoiding a problem that statistic information can not be transferred due to a not-yet-unified notification message format described above.

For accomplishing the first object, the present invention introduces a mechanism (technique) capable of unitarily processing into a control device such as a concentrative server with respect to each of functions for traffic engineering that has been performed so far in an autonomous distributive manner in edge nodes.

If a network scale expands, however, it is considered that a load of the control device itself increases. Therefore, the functions necessary for the TE are installed into the edge nodes, and an active TE function is switched over to between the edge nodes and the control device in accordance with load states of the edge routers and of the control device. This scheme actualizes efficient load sharing even in a large-scale network.

To accomplish the second object given above, pieces of statistic information are gathered by using the notification message with respect to the nodes each having a notification message processing function, and the control device concentratedly gathers the statistic information with respect to the nodes having none of the notification message processing functions.

According to a preferred embodiment, a first wide area load sharing control system includes a module determining a ratio at which an input traffic to ingress edge nodes is distributed to a plurality of paths set up between the ingress edge nodes and egress edge nodes that correspond to within a traffic engineering section within a network, and a module indicating which unit, a sharing control unit corresponding to the ingress edge nodes or other concentration control unit, executes a process of determining the ratio at which the input traffic to the ingress edge nodes is distributed to the plurality of paths.

In this architecture, the indicating module may indicate which unit, the sharing control unit or the concentration control unit, takes charge of the above process in accordance with load states of the sharing control unit and of the concentration control unit.

Further, the concentration control unit may be a network control device concentratedly controlling a plurality of nodes including the ingress edge nodes and the egress edge nodes existing in the traffic engineering section within the network. The indicating module may be provided in a state monitoring device outside the network control device. The network may be an MPLS-based label switching network.

Moreover, when the sharing control unit corresponding to the ingress edge nodes gathers statistic information showing a load state in the network, the sharing control unit may gather directly the statistic information from the nodes capable of using a notification message based on a specified protocol, and may gather, through the concentration control unit, the statistic information from the nodes incapable of using the notification message based on the specified protocol.

A second wide area load sharing control system of the present invention includes a statistic information gathering module obtaining from respective nodes, as statistic information, a traffic state of links connected to the respective nodes in a network, a route determining module determining, based on the obtained statistic information, at least one route for extending a plurality of paths between ingress edge nodes and egress edge nodes that correspond to within a traffic engineering section in the network, and a load sharing determining module determining, based on the obtained statistic information, a ratio at which a traffic should be distributed to respective paths on the determined route. Active modules among the statistic information gathering module, the route determining module and the load sharing determining module are switched over to between the ingress edge nodes and the network control device concentratedly controlling the respective nodes, mutually.

In this architecture, the ingress edge node may include an allocating module allocating packets arrived at, to paths on the route on the basis of the ratio, indicated by the load sharing determining module, at which the traffic should be distributed to the paths on the route.

Moreover, the second wide area load sharing control system may further include a state monitoring device having a module gathering and judging the load states of the ingress edge nodes and the network control device, and an indicating module switching over active modules among the statistic information gathering module, the route determining module and the load sharing determining module to between the ingress edge nodes and the network control device in accordance with the load states, mutually.

Further, when the ingress edge nodes gather the statistic information showing a load state within the network, the ingress edge nodes may gather directly the statistic information from the nodes capable of using a notification message based on a specified protocol, and may gather, through the network control device, the statistic information from the nodes incapable of using the notification message based on the specified protocol.

Moreover, if the ingress edge node does not include the load sharing determining module, the load sharing determining module of the network control device may be made to operate. The network may be an MPLS-based label switching network.

A first wide area load sharing control method of the present invention include determining a ratio at which an input traffic to ingress edge nodes is distributed to a plurality of paths set up between the ingress edge nodes and egress edge nodes that correspond to within a traffic engineering section within a network, and indicating which unit, a sharing control unit corresponding to the ingress edge nodes or other concentration control unit, executes a process of determining the ratio at which the input traffic to the ingress edge nodes is distributed to the plurality of paths.

A second wide area load sharing control method of the present invention includes obtaining from respective nodes, as statistic information, a traffic state of links connected to the respective nodes in a network, determining, based on the obtained statistic information, at least one route for extending a plurality of paths between ingress edge nodes and egress edge nodes that correspond to within a traffic engineering section in the network, determining, based on the obtained statistic information, a ratio at which a traffic should be distributed to respective paths on the determined route, and switching over processing modules of the respective steps to between the ingress edge nodes and the network control device concentratedly controlling the respective nodes, mutually.

In this architecture, the wide area load sharing control method further includes gathering and judging the load states of said ingress edge nodes and said control device, and giving an indication of switching over the processing modules to between said ingress edge nodes and said control device mutually in accordance with the load states.

BRIEF DESCRIPTION OF THE DRAWINGS

The foregoing and other features and advantages of the present invention will become more readily appreciated as the same becomes better understood by reference to the following detailed description when taken into conjunction with the accompanying drawings wherein;

FIG. 6 is an explanatory view showing a wide area load sharing control system in a third embodiment of the present invention.

DETAILED DESCRIPTION OF THE PREFERRED EMBODIMENTS

Next, embodiments of the present invention will hereinafter be described with reference to the accompanying drawings.

[First Wide Area Load Sharing Control System]

Figure 1:
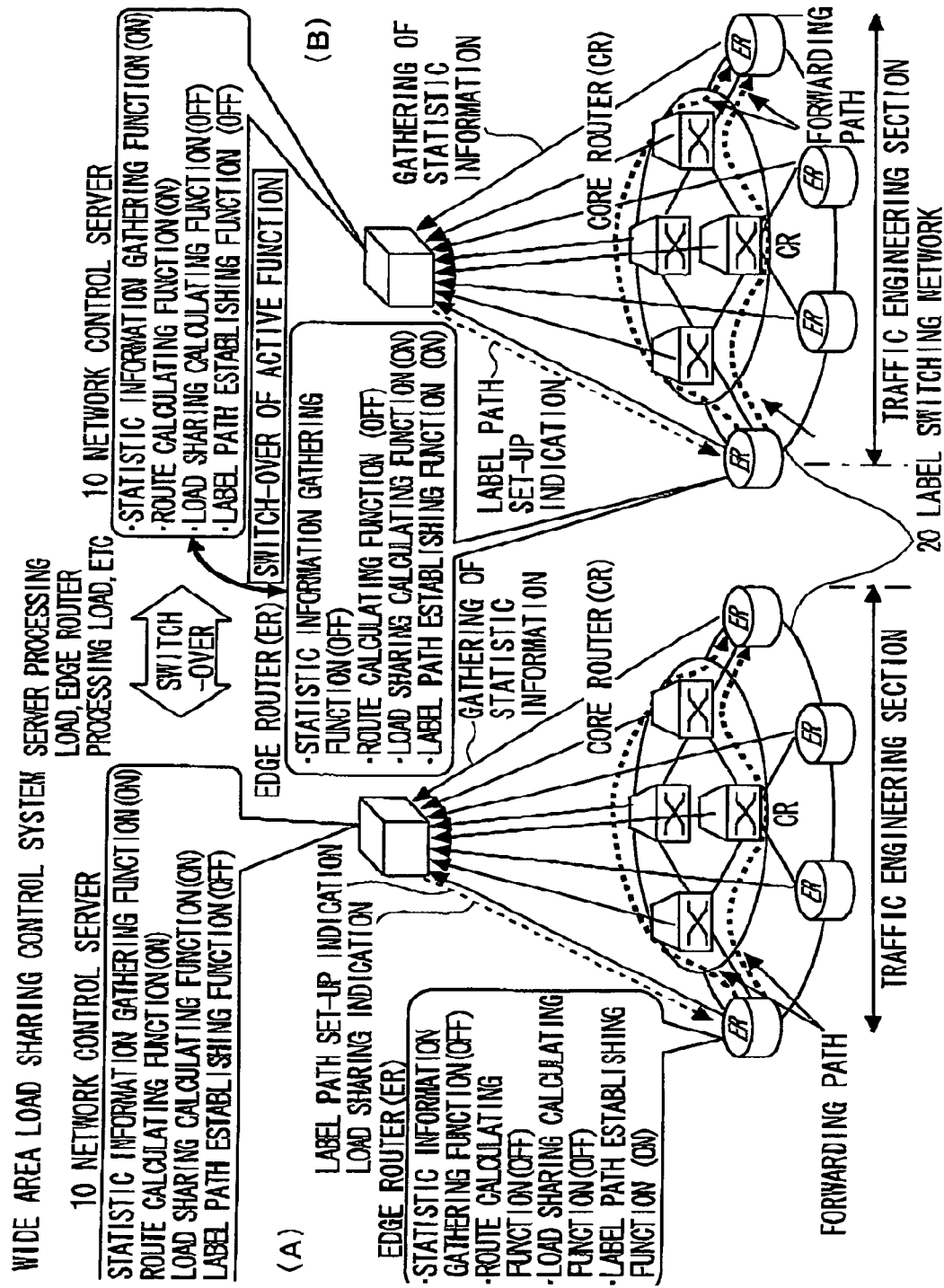
FIG. 1 is an explanatory view showing a wide area load sharing control system in first and fourth embodiments of the present invention.
Figure 2:
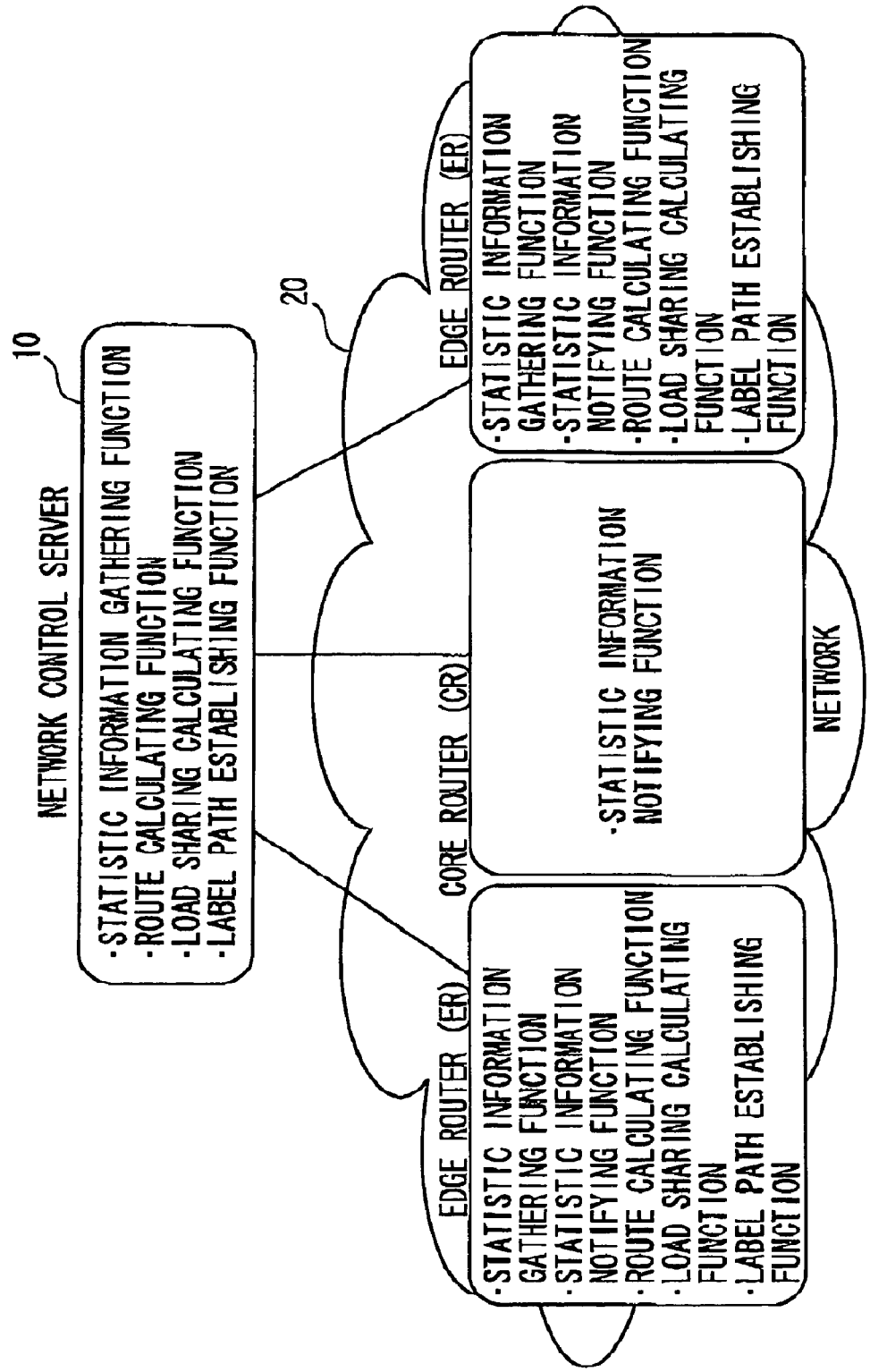
FIG. 2 is an explanatory view showing an architecture of functions of a network server, edge routers and core routers in FIG. 1.

FIG. 1 shows an architecture of a wide area load sharing control system in a first embodiment of the present invention. FIG. 2 is an explanatory view showing an architecture of functions of a network control server, edge routers and a core router in FIG. 1.

Referring to FIGS. 1 and 2, this wide area load sharing control system 1 includes a network control server (network control device) 10 and a label switching network (MPLS (Multiprotocol Label Switching network) 20 as an IP network.

The label switching network 20 is configured by a plurality of edge routers (ingress edge routers and egress edge routes) ER positioned at a network boundary, and a plurality of core routers CR positioned inside the network.

The respective edge routers ER and core routers CR as nodes are connected to the network control server 10 for unitarily (concentratedly) controlling a traffic engineering control function. The network control server 10 is physically or logically provided in the label switching network 20.

Each of the network control server 10 and the edge routers ER is provided with the same function module as a function necessary for actualizing traffic engineering (TE). Herein, each of the network control server 10 and the edge routers ER has a statistic information gathering function module, a route calculating function module, a load sharing calculating function module and a label path establishing (label assigning) function module.

Further, each of the edge routers ER and the core routers CR has, in addition to a statistic information notifying function module, a labeled packet forwarding function module for forwarding a labeled packet to a label path corresponding to a logical connection between the edge routers ER that is set up by the label path establishing function module.

To describe it in greater detail, in the network control server 10 and each of the edge routers ER, the statistic information gathering function module (traffic state monitoring module) obtains, as statistic information, pieces of traffic state information of links (physical links between the routers) connected to the respective routers from each of the edge routers ER and the core routers CR within the label switching network 20.

Further, in the network control server 10 and each of the edge routers ER, the route calculating function module (routing module) determines, based on the traffic state information obtained by the statistic information gathering function module, at least one route (on IP) for extending a plurality of label paths between the ingress edge router ER and the egress edge router ER (this ingress-to-egress router interval is called a traffic engineering section) in the label switching network 20.

Moreover, the load sharing calculating function module (load sharing determining module) in the network control server 10 and each of the edge routers ER determines a packet forwarding (traffic) ratio at which the packets should be distributed to the respective paths, on the basis of the traffic state information obtained by the statistic information gathering function module, for the paths (label paths) on the route between the ingress edge router ER and the egress edge router ER, which route is determined by the route calculating function module.

The ingress edge router ER in the label switching network 20 further includes a packet allocating module (unillustrated) for allocating the packets arriving from outside of the label switching network 20 to a plurality of transfer paths on the basis of an indication of the packet forwarding ratio, given from the load sharing calculating module, for forwarding the packets to the paths.

The network control server 10 and the ingress edge router ER in the wide area load sharing control system 1 described above mutually switch over the active modules among the statistic information gathering function modules, the route calculating function modules, the load sharing calculating modules and the label path establishing function modules in accordance with their respective states, particularly a load state. Namely, the wide area load sharing control in the large-scale label switching network 20 can be attained by switching over a role of taking charge of the functions to between the network control server 10 and the ingress edge routers ER.

In this wide area load sharing control system 1, for example, at a certain point of time, as shown in FIG. 1(A), the network control server 10 takes charge of the operations of the statistic information gathering function module, the route calculating function module and the load sharing calculating function module, while the ingress edge routers ER take charge of the operation of the label path establishing function module.

In this case, the traffic operation for the wide area load sharing is engineered based on the statistic information gathered by the network control server 10. To be specific, if it is judged from the traffic state information gathered by the statistic information gathering function module that the label paths with the load sharing being performed encounter a congestion, the route calculating module searches for a new route. Further, the load sharing calculating function module calculates based on the statistic information what ratio the traffic should be distributed among the routes at, and so on.

The network control server 10 notifies the ingress edge router ER of the route information detected by the route calculating function module. The label path establishing function module of the ingress edge router ER sets up label paths on the route of which the ingress edge router ER has been notified. The set-up of the label paths involves the use of an existing signaling protocol such as RSVP-TE (Resource Reservation Protocol-TE)

The label switching network 20 controls the load sharing among one or more pairs of ingress edge routers ER and egress edge routers ER, and the network control server 10 performs the load sharing calculation for the respective ingress edge routers ER. Accordingly, there might be a case where a load of the load sharing calculation process rises in the large-scale network spreading over the wide area.

Such being the case, if the calculation processing load of the network control server 10 reaches a predetermined level, the network control server 10 switches over the load sharing calculation process, which has been executed so far for each of the ingress edge routers ER, to each of the same routers so that these routers themselves perform the load sharing calculation process (see FIG. 1(B)). Each ingress edge router ER executes the load calculating process for the label path extending from the self-edge router to other router.

This scheme relieves the processing load on the network control server 10, whereby the network control server 10 can assign CPU resources to other functions such as the route calculating function and the statistic information gathering function for the traffic engineering (TE). Note that the switch-over target function is not limited to only the load sharing calculation process described above.

[Second Wide Area Load Sharing Control System]

Figure 3:
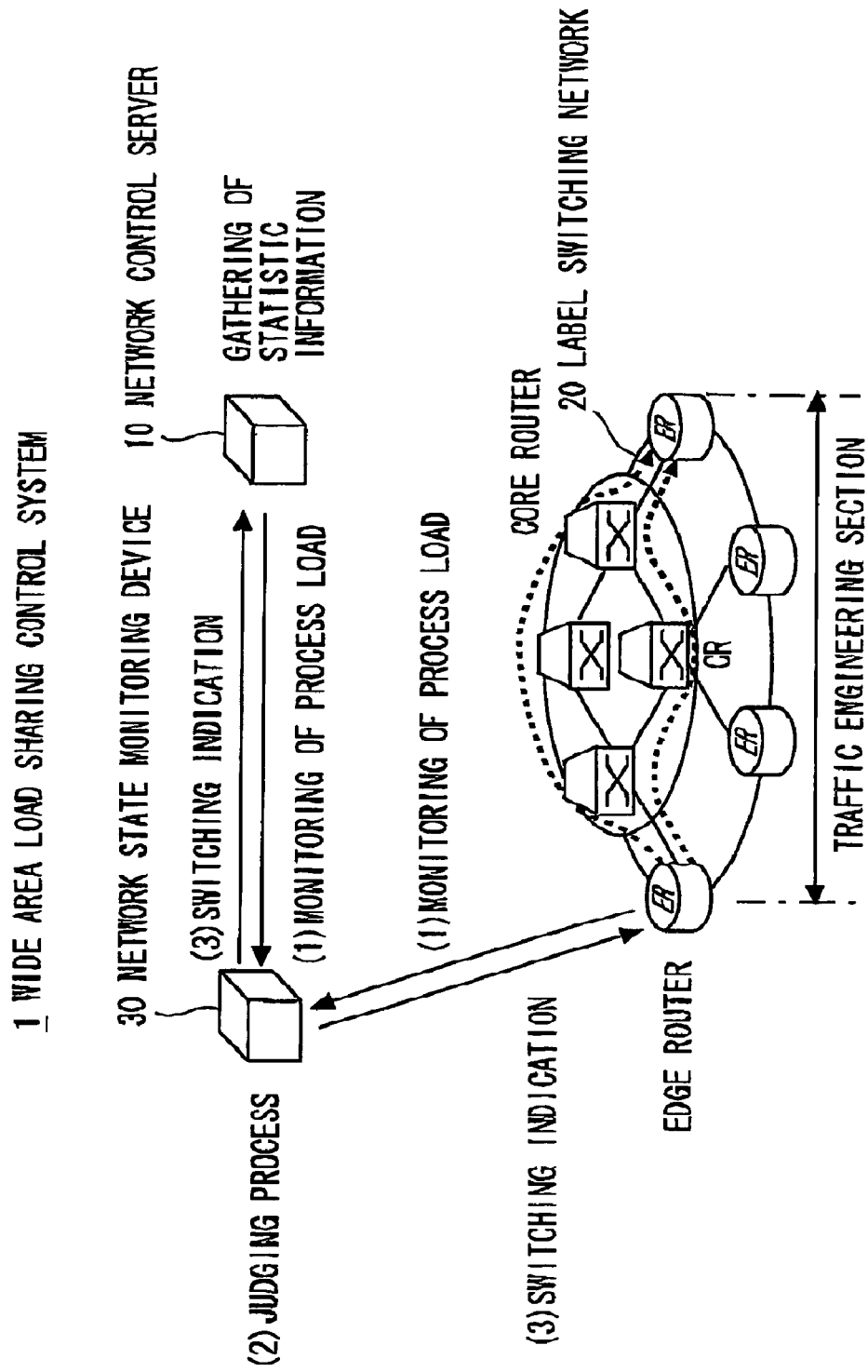
FIG. 3 is an explanatory view showing a wide area load sharing control system in a second embodiment of the present invention.
Figure 4:
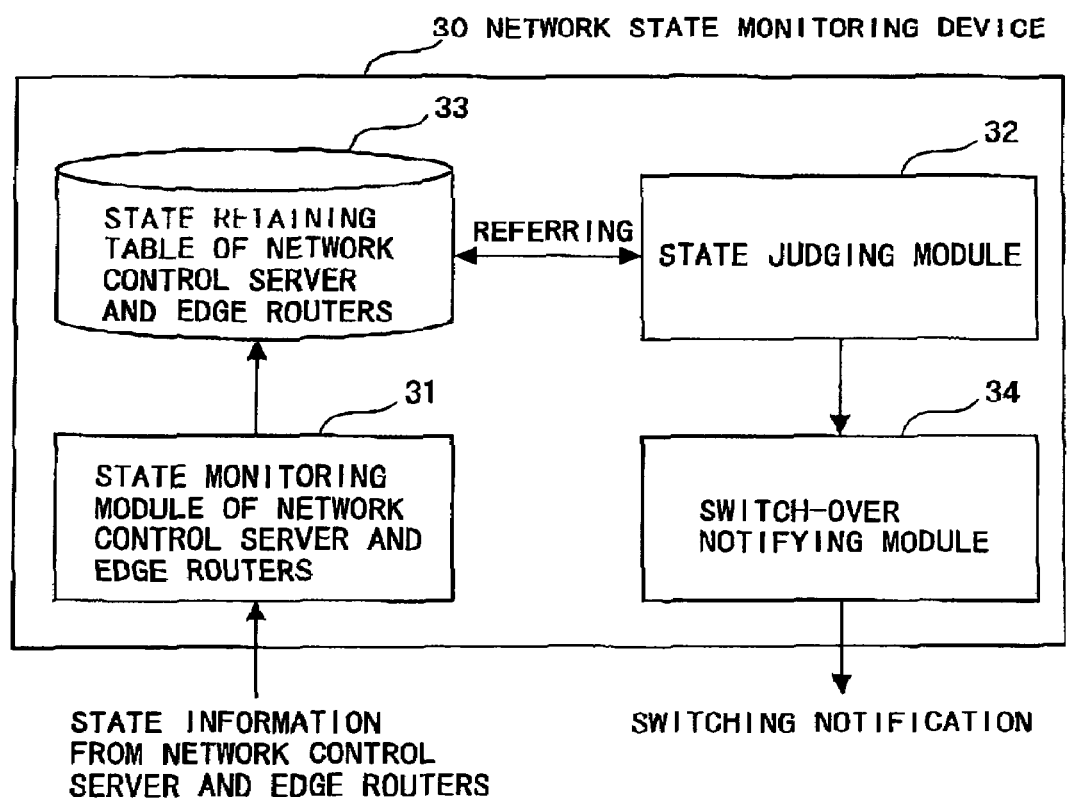
FIG. 4 is a block diagram showing an example of an architecture of a network state monitoring device in FIG. 3.
Figure 5:
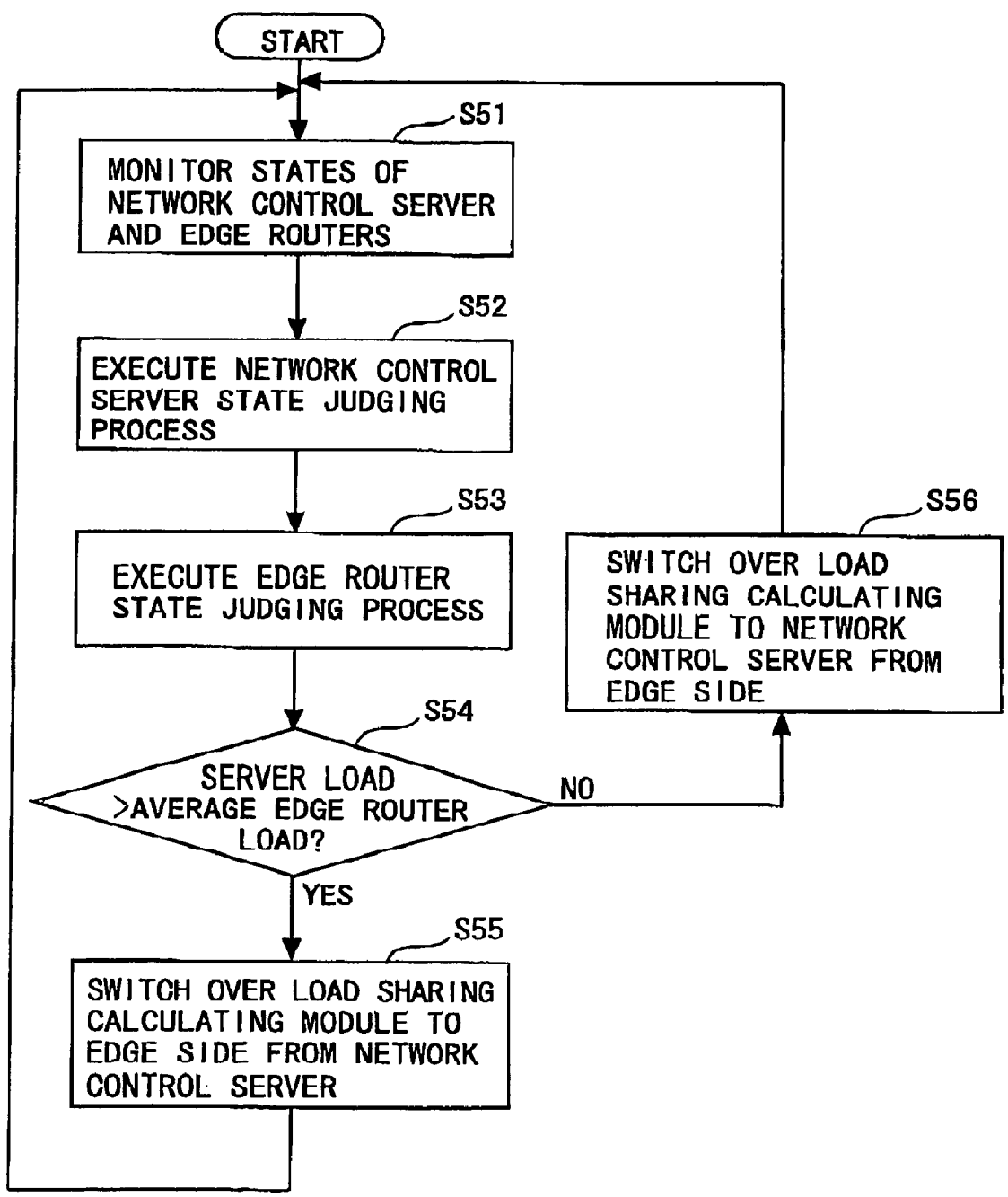
FIG. 5 is a flowchart showing a state judging process of the network state monitoring device in FIG. 4.

FIG. 3 shows an architecture of the wide area load sharing control system in a second embodiment of the present invention. FIG. 4 shows a detailed architecture of a network state monitoring device in FIG. 3. FIG. 5 is an explanatory flowchart showing a state judging process in the network state monitoring device.

Referring to FIGS. 4 and 5, this wide area load sharing control system 1 includes the network control server 10, the label switching network 20 and a network state monitoring device 30.

The respective function modules of the network control server 10, and of the edge routers ER and the core routers CR configuring the label switching network 20, take the same structures as those in the first embodiment discussed above, excepting what will be explained herein.

In the wide area load sharing control system 1 in the second embodiment, the network state monitoring device 30 physically or logically disposed within the label switching network 20 is introduced by way of another example of switching over the traffic engineering function to between the network control server 10 and the ingress edge routers ER.

The network state monitoring device 30 includes a state monitoring module 31, a state judging module 32 and a state retaining table 33 in order to monitor and judge the load states of the ingress edge routers ER in the label switching network 20 and of the network control server 10.

Further, the network state monitoring device 30 further includes a switch-over notifying module 34 for gathering the load states of the network control server 10 and of the ingress edge routers ER, judging the states of the network control server 10 and of the ingress edge routers ER, and giving a notification (indication) of a switch-over of the function in cooperation with the state monitoring module 31, the state judging module 32 and the state retaining table 33.

The introduction of this network state monitoring device 30 enables the active modules among the statistic information gathering function module, the route calculating module, the load sharing calculating function and the label path establishing function module to be switched over to between the network control server 10 and the ingress edge routers ER in accordance with the load states of the network control server 10 and of the ingress edge routers ER.

What can be adopted as specific techniques by which the network state monitoring device 30 gives an instruction of switching over the function in accordance with the load states of the network control server 10 and of the ingress edge routers ER, may be (1) a command-line interface (CLI) as a general-purpose interface for remote-controlling a device by logging in through Telnet from outside, or (2) COPS (Common Open Policy Service) that is a protocol for policy control.

To describe it in greater detail, the state monitoring module of the network state monitoring device 30 connected to the network control server 10 and to the ingress edge routers ER monitors the load states of the network control server 10 and of the ingress edge routers ER and gathers the information thereof (step S51 in FIG. 5).

The state monitoring module 31 gathers, for example, at an interval of a fixed period, the load state information (processing load state information) such as a CPU utilization, a memory usage, etc. that are indicative of the respective load states of the network control server 10 and the ingress edge routers ER from the same server and routers.

Further, the network state judging module 32 of the network monitoring device 30 judges a device state such as the load state of the network control server 10 or the ingress edge router ER on the basis of the load state information gathered by the state monitoring module 31 and stored in the state retaining table 33 (S52, S53).

On this occasion, a load state judging condition involves adopting a method of comparing the load (the CPU utilization and the memory usage) of the network control server 10 with an average load (of the CPU utilization and of the memory usage) of all the ingress edge routers ER (S54) or a method of comparing the load of the network with a maximum load of the loads of all the ingress edge routers ER. Herein, the state judging module 32 takes the former method as the load state judging condition.

The switch-over notifying module 34 of the network state monitoring device 30, if the load of the network control server 10 exceeds the average load of all the ingress edge routers ER as a result of the judgement about the load state by the state judging module 32, indicates both of the network control server 10 and the ingress edge routers ER to switch over the process of, e.g., the load sharing calculating function module to the ingress edge routers ER from the network control server 10 (S55).

On the other hand, the switch-over notifying module 34, if the load of the network control server 10 is equal to or lower than the average load of all the ingress edge routers ER as a result of the judgement about the load state by the state judging module 32, indicates both of the network control server 10 and the ingress edge routers ER to switch over the process of, e.g., the load sharing calculating function module to the network control server 10 from the ingress edge routers ER (S56).

In the wide area load sharing control system 1 in the second embodiment discussed above, the network state monitoring device 30 automatically makes the judgement and gives the indication of the switch-over of the TE function to between the network control server 10 and the ingress edge routers ER, however, a network administrator also can manually switch over the TE function corresponding to an external condition. In this case, for instance, when desiring to restart up the network control server 10, a method which can be adopted herein is that all the TE functions are switched over to the ingress edge routers ER and, after starting up the network control server 10, the necessary functions are switched over again to the network control server 10.

The state monitoring process and the state judging process by the network state monitoring device 30 described above correspond to functions performed by a so-called policy server for judging the load state of the network (label switching network 20) and, if a preset condition is met, executing a predetermined process.

Note that when the TE function is switched over to between the network control server 10 and the ingress edge routers ER in the wide area load sharing control system 1 in the first embodiment discussed above, the network control server 10 may monitor the load states (the CPU utilization, the memory usage) of the network control server itself and of the ingress edge routers ER. According to this function switching method, the monitoring of the load states of the ingress edge routers ER can be actualized by use of the statistic information gathering function module provided in the network control server 10. Further, the network state is judged by the network control server 10.

[Third Wide Area Load Sharing Control System]

FIG. 6 is an explanatory view showing the wide area load sharing control system in a third embodiment of the present invention. Given herein is an explanation of methods for actualizing the traffic engineering in a case where the routers (ingress edge routers ER and core routers CR) having none of the statistic information notifying function modules (traffic state notifying modules) in the label switching network 20 of the wide area load sharing control system 1.

For monitoring the load states of the links (physical links) connected to the edge routers (ingress and egress edge routers) ER and to the core routers CR in the label switching network 20, there are two types of methods. One method (the first embodiment) is that the network control server 10 gathers the statistic information (traffic state information) of all of the edge routers ER and the core routers CR. The other method is that each of all the routers notifies each edge router ER of the self-router statistic information.

A method of using option message Opaque LSA (Link State Advertisement) based on an OSPF (Open Shortest Path First) protocol is proposed as a specific example of carrying out the latter method. In the case of utilizing the Opaque LSA, as shown in FIG. 6, all the routers within the label switching network 20 create the Opaque LSAs recorded with the statistic information of the links connected to the self-router and send the Opaque LSAs to the all the output links.

The router receiving the Opaque LSA from a neighboring router forwards the packet to the link other than the link receiving this Opaque LSA. Each of the routers repeats this kind of forwarding process, whereby pieces of link statistic information about all the routers are exchanged mutually with the result that the edge router ER controlling the traffic engineering (TE) eventually acquires the statistic information about all the routers.

According to this statistic information gathering method, it is required that all the routers in the label switching network 20 be capable of processing the option message in order to use this message. If a router incapable of processing this message exists in the label switching network 20, the edge routers ER are not notified of the statistic information of this incapable-of-processing router.

Accordingly, even in the case where the router incapable of processing the Opaque LSA exists in the label switching network 20, for actualizing the traffic engineering (TE), the routers capable of processing the Opaque LSAs gather pieces of statistic information about the routers themselves and notify the edge routers ER of the same statistic information indicative of the traffic states in a way that sends the Opaque LSAs, while the network control server 10 gathers the statistic information about the router having no function of processing the Opaque LSA and notifies the edge routers ER of the same statistic information.

In this case, each of the edge routers ER simply includes a statistic information integration processing module (not shown) for integrating the Opaque LSAs received from other routers with the statistic information given from the network control server 10. With this scheme, the edge routers ER can know the traffic states of all the routers in the label switching network 20.

[Fourth Wide Area Load Sharing Control System]

Next, the wide area load sharing control system in a fourth embodiment of the present invention will be explained. Herein, a method for actualizing the traffic engineering in a case where an edge router having no load sharing calculating function module exists in the label switching network 20 of the wide area load sharing control system 1, will be described referring to FIG. 1.0

As in the case where there exist the edge routers ER and the core routers CR that have none of the statistic information notifying function modules described above, it might be considered that some edge routers ER in the label switching network 20 do not include the load sharing calculating function modules.

In this case, the traffic passing through the edge routers having none of the load sharing calculating function modules does not undergo the wide area load sharing process, and hence the effects such as avoiding the congestion, improving a network bandwidth activity efficiency, etc. can not be expected as essential purposes.

Therefore, the routers ER having the load sharing calculating function modules calculate by themselves the load sharing of the traffic passing through these edge routers ER, while the load sharing calculating function module of the network control server 10 calculates and processes the load sharing on the router-by router basis about the edge routers ER that do not include the load sharing calculating function modules, thus executing the load sharing calculation processes in all the edge routers ER.

Note that a method disclosed in Japanese Patent Application Laid-Open Publication No. 2001-320420 is available as a specific example of the load sharing calculation process.

As discussed above, according to the present invention, it is possible to efficiently execute the wide area load sharing at a large-scale by relieving the processing load of the functions necessary for the traffic engineering which have hitherto been performed in the edge nodes.

Further, according to the present invention, the wide area load sharing can be attained without adding any special message processing function to the conventional edge and core routers by avoiding a problem that the statistic information could not be transferred due to a not-yet-unified notification message format.

MODIFIED EXAMPLE

The processes in the embodiments discussed above can provided as a program executable by a computer, and the program can be provided as on a recording medium such as a CD-ROM, a flexible disk, etc. and further via communication lines.

Moreover, the respective processes in the embodiment discussed above can be carried out in a way that selects an arbitrary plurality of processes or all the processes and combines these processes.

Although only a few embodiments of the present invention have been described in detail above, those skilled in the art will readily appreciate that many modifications are possible in the preferred embodiments without departing from the novel teachings and advantages of this invention. Accordingly, all such modifications are intended to be included within the scope of the present invention as defined by the following claims.

What is claimed is:

1. A wide area load sharing control system comprising:
   means for determining a distribution ratio at which an input traffic to ingress edge nodes is distributed to each of a plurality of paths set up between said ingress edge nodes and egress edge nodes that correspond to a traffic engineering section in a network; and
   means for indicating whether a sharing control unit corresponding to each of said ingress edge nodes or a concentration control unit, that executes a process of determining the distribution ratio at which the input traffic to said ingress edge nodes is distributed to each of the plurality of paths.

2. The wide area load sharing control system according to claim 1, wherein said means for indicating said sharing control unit or said concentration control unit, that takes charge of the determining process in accordance with load states of said sharing control unit and of said concentration control unit.

3. The wide area load sharing control system according to claim 1, wherein said concentration control unit is a network control device concentratedly controlling a plurality of nodes including said ingress edge nodes and said egress edge nodes existing in the traffic engineering section of the network.

4. The wide area load sharing control system according to claim 3, wherein said means for indicating is provided in a state monitoring device outside said network control device.

5. The wide area load sharing control system according to claim 1, wherein the network is an MPLS-based label switching network.

6. The wide area load sharing control system according to claim 1, wherein when said sharing control unit corresponding to each of said ingress edge nodes gathers statistic information showing a load state in the network, said sharing control unit gathers directly the statistic information from said nodes capable of using a notification message based on a specified protocol, and gathers, through said concentration control unit, the statistic information from said nodes incapable of using the notification message based on the specified protocol.

7. A wide area load sharing control system comprising:
statistic information gathering means for obtaining from respective nodes, as statistic information, a traffic state of links connected to said respective nodes in a network;
route determining means determining, based on the obtained statistic information, at least one route for extending a plurality of paths between ingress edge nodes and egress edge nodes that correspond to a traffic engineering section in the network; and
load sharing determining means for determining, based on the obtained statistic information, a distribution ratio at which a traffic should be distributed to respective paths on the determined route,
wherein said statistic information gathering means, said route determining means and said load sharing determining means are switched over to between said ingress edge nodes and a network control device concentratedly controlling said respective nodes, mutually.

8. The wide area load sharing control system according to claim 7, wherein said ingress edge node includes allocating means for allocating packets arrived at, to the paths on said route on the basis of the distribution ratio, indicated by said load sharing determining means, at which the traffic should be distributed to the paths on the route.

9. The wide area load sharing control system according to claim 7, further comprising a state monitoring device including:
means for gathering and judging load states of said ingress edge nodes and said network control device; and
indicating means for switching over said statistic information gathering means, said route determining means and said load sharing determining means to between said ingress edge nodes and said network control device in accordance with the load states, mutually.

10. The wide area load sharing control system according to claim 7, wherein when said ingress edge nodes gather the statistic information showing a load state in the network, said ingress edge nodes gather directly the statistic information from said nodes capable of using a notification message based on a specified protocol, and gather, through said network control device, the statistic information from said nodes incapable of using the notification message based on the specified protocol.

11. The wide area load sharing control system according to claim 7, wherein if said ingress edge node does not include said load sharing determining means, said load sharing determining means of said network control device is made to operate.

12. The wide area load sharing control system according to claim 7, wherein the network is an MPLS-based label switching network.

13. A wide area load sharing control method executed by one of a sharing control unit and a concentration control unit being a computer respectively, the method comprising:
determining a distribution ratio at which an input traffic to ingress edge nodes is distributed to each of a plurality of paths set up between said ingress edge nodes and egress edge nodes that correspond to a traffic engineering section in a network; and
indicating whether the sharing control unit corresponding to each of said ingress edge nodes or the concentration control unit, that executes a process of determining the distribution ratio at which the input traffic to said ingress edge nodes is distributed to each of the plurality of paths.

14. A wide area load sharing control method executed by one of a control device and ingress edge nodes being a computer respectively, the method comprising:
obtaining from respective nodes, as statistic information, a traffic state of links connected to said respective nodes in a network;
determining, based on the obtained statistic information, at least one route for extending a plurality of paths between ingress edge nodes and egress edge nodes that correspond to a traffic engineering section in the network;
determining, based on the obtained statistic information, a distribution ratio at which a traffic should be distributed to respective paths on the determined route; and
switching over processing means of said obtaining and said determinings to between said ingress edge nodes and a said control device concentratedly controlling said respective nodes, mutually.

15. The wide area load sharing control method according to claim 14, the method further executed by a state monitoring device being a computer outside said control device, the method further comprising:
gathering and judging load states of said ingress edge nodes and said control device; and
giving an indication of switching over the processing means to between said ingress edge nodes and said control device mutually in accordance with the load states.

* * * * *